United States Patent
Reichman et al.

(10) Patent No.: US 6,535,716 B1
(45) Date of Patent: Mar. 18, 2003

(54) MONITOR AND CONTROL SYSTEM FOR SATELLITE COMMUNICATION NETWORKS AND THE LIKE

(75) Inventors: Arie Reichman, Kfar Saba (IL); Shaul Laufer, Tel Aviv (IL); Steve Yablonski, Mt Sinai, NY (US); Scott Hershander, Nesconset, NY (US)

(73) Assignees: Globecomm Systems Inc., Hauppauge, NY (US); Shiron Satellite Communications Ltd., Petach Tikva (IR)

( * ) Notice: Subject to any disclaimer, the term of this patent is extended or adjusted under 35 U.S.C. 154(b) by 0 days.

(21) Appl. No.: 09/333,617

(22) Filed: Jun. 15, 1999

(51) Int. Cl.[7] .............................................. H04B 7/185
(52) U.S. Cl. ...................... 455/12.1; 455/427; 370/345; 370/346
(58) Field of Search .................................. 370/321, 326, 370/345, 348, 346, 447, 448, 436, 478; 455/12.1, 535, 427, 428, 13.1

(56) References Cited

U.S. PATENT DOCUMENTS

| | | | | | |
|---|---|---|---|---|---|
| 5,303,234 A | * | 4/1994 | Kou | ............................. | 370/442 |
| 5,555,242 A | * | 9/1996 | Saitou | ......................... | 370/321 |
| 5,734,833 A | * | 3/1998 | Chiu et al. | ................... | 709/225 |
| 5,898,681 A | * | 4/1999 | Dutta | ........................... | 370/229 |
| 6,233,429 B1 | * | 5/2001 | Soffer et al. | ................ | 455/12.1 |

* cited by examiner

Primary Examiner—Thanh Cong Le
Assistant Examiner—Lana Le
(74) Attorney, Agent, or Firm—Morgan, Lewis & Bockius LLP

(57) ABSTRACT

A monitor and control system for satellite communication networks includes a hub computer terminal arranged in a network with a plurality of remote computer terminals to form a mesh communications network. The hub terminal provides frequency and time division multiplexing functions for transmitting and receiving monitor and control data packets to and from each remote terminal, and for utilizing frequencies already in use by the remote terminals without interfering with the communication of data between the remote terminals.

1 Claim, 3 Drawing Sheets

MONITOR AND CONTROL SYSTEM FOR SATELLITE COMMUNICATION NETWORKS AND THE LIKE

BACKGROUND OF THE INVENTION

The present invention relates generally to wireless communication networks, and more particularly, to a monitor and control system for satellite communication networks and the like.

Conventional satellite communication networks have found widespread use by television networks, telephone companies and the like. In recent years, with the advent of digital communications, communications via satellite links have become more readily available to small businesses and individuals. Of particular interest is the satellite linkage between remote computers and global computer network systems, such as the Internet.

Digital satellite communication systems typically include a hub terminal for communicating with multiple remote terminals, which typically include computers or other digital data-processing devices. One or more modems are connected to each hub terminal for modulating and demodulating data to be transmitted on the satellite's frequency band. To accommodate more than one remote terminal at a time, the hub terminal communicates with each remote terminal on a different frequency or channel of the satellite's transponder spectrum. This arrangement is known as a star network. In another method known as time-division multiplexing, many different remote terminals use the same frequency, but transmit data in packets arranged in selected time slices of the data stream.

To effect multiple communications, the hub terminal transmits various control signals for commanding the remote modem, such as signals for tuning to a particular channel for data transfer. The hub terminal receives various signals from remote terminals for monitoring the network operation. Monitoring signals also permit the hub terminal to monitor usage of the remote terminals. This feature has found particular application for billing remote terminal users for satellite time. The control and monitor signals are transmitted on the same frequencies using the same equipment or different frequencies using different equipment.

In effect, a network is provided where one remote terminal communicates with another without using the hub terminal. This is known as a "mesh" network, i.e., any terminal within the network may communicate directly with any other terminal. Two transmission frequencies are allocated to each pair of terminals for two-way communication. The main advantage of mesh networks over star networks is that mesh networks are more frequency efficient. That is, in a mesh network a communications link between two points requires the use of two transmission frequencies, whereas in a star network, all data must pass through the hub so that four transmission frequencies must be used.

In a mesh network the main task of the hub terminal is to allocate frequencies to the terminals and to continue to monitor the mesh network. The control and monitoring task in a mesh network is more complex than it is in a star configuration. One solution that has been proposed to carry out the control and monitoring tasks in a network mesh is the use of a special frequency with a dedicated modem at each terminal. This approach, however, requires the use of additional hardware at the remote site, thereby adding to the cost and complexity of the system.

The use of dedicated equipment in the remote terminals to perform the control and monitoring task is possible during the initialization phase, that is, before the terminal is communicating with another terminal. However, after a link is established between two terminals, the control and monitoring of those terminals by the hub with such dedicated terminal equipment would require the interruption of the data traffic stream. There is thus a need for a satellite communication monitor and control system in which dedicated terminal traffic equipment can be used to monitor and control data communication without interfering with the data traffic stream.

SUMMARY OF THE INVENTION

It is an object of the present invention to provide an economical and efficient monitor and control system for satellite communications networks and the like.

It is another object of the present invention to provide an improved monitor and control system for satellite communications networks that is reliable and utilizes a hub station for monitoring and controlling links between remote terminals.

A further object of the present invention is to provide a non-intrusive monitor and control system which facilitates ready transmission of a data stream between remote terminals of a mesh network.

Yet another object of the present invention is to provide a fully functional monitor and control system for satellite communications networks without sacrificing efficiency.

Still another object of the present invention is to provide a monitor and control system of the type described that yields optional bandwidth on demand features to remote terminals.

Yet a further object of the present invention is to provide a monitor and control system for a satellite communication network that permits a service provider to charge for actual satellite usage while providing broad bandwidth on demand.

According to one aspect of the present invention, a monitor and control system for satellite communication network includes a hub computer terminal arranged in a network with a plurality of remote computer terminals to form a mesh communications network. The hub terminal has frequency and time division multiplexing functions for transmitting and receiving monitor and control data packets to and from respectively each remote terminal, and for utilizing frequencies already in use by the remote terminals without interfering with passage of data between remote terminals.

Also described is a method of monitoring and controlling the passage of data through a satellite communication network in which a hub computer terminal is arranged in a mesh communications network with a plurality of remote computer terminals. Monitor and control data packets are transmitted to and received from each remote terminal via frequency and time division multiplexing functions of the hub terminal, so as to utilize frequencies already in use by the remote terminals without interfering with passage of data between remote terminals.

The present invention will now be further described by reference to the following drawings which are not intended to limit the accompanying claims.

DETAILED DESCRIPTION OF THE PREFERRED EMBODIMENTS

A monitor and control system for a satellite communication network and the like, according to an embodiment of the present invention, is illustrated in FIGS. 1–5. Broadly considered, the monitor and control system therein shown comprises a hub computer terminal arranged in a network with a plurality of remote computer terminals to form a mesh communications network. The hub terminal has frequency and time division multiplexing functions for transmitting and receiving monitor and control data packets to and from each remote terminal, respectively. The hub terminal also utilizes frequencies already in use by the remote terminals without interfering with data passage between remote terminals.

The method of monitoring and controlling the passage of data through a satellite communication network in accordance with the invention comprises (i) arranging a hub computer terminal into a mesh communications network with a plurality of remote computer terminals, then (ii) transmitting and receiving monitor and control data packets to and from each remote terminal, respectively, via frequency and time division multiplexing functions of the hub terminal, so as to utilize frequencies already in use by the remote terminals without interfering with passage of data between the remote terminals.

Figure 1:
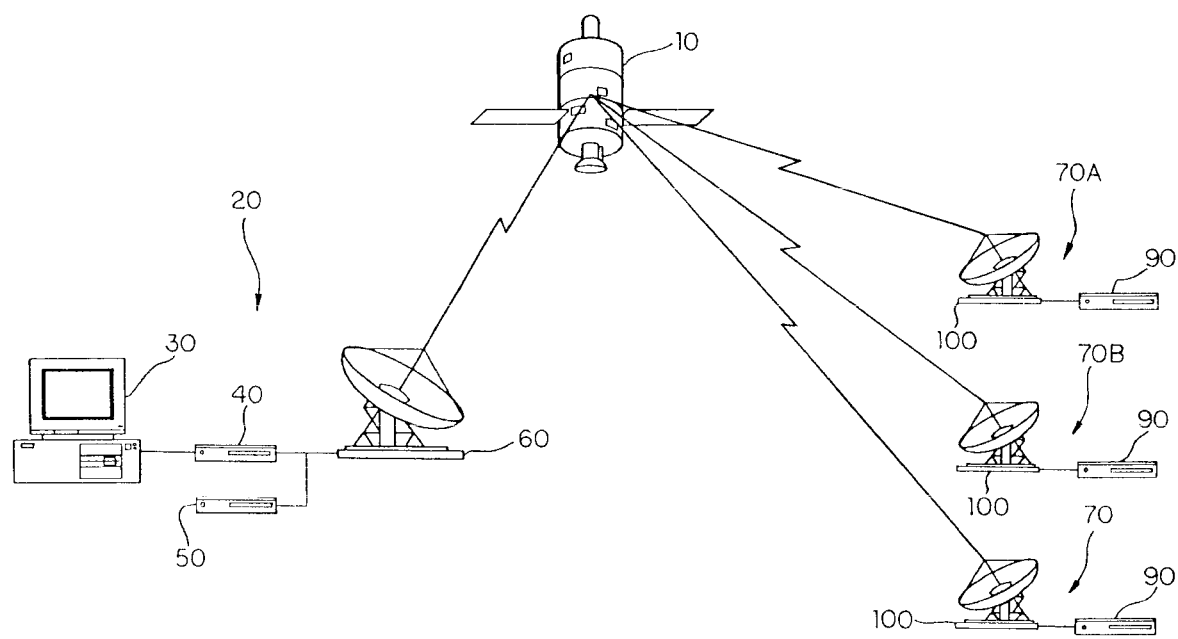
FIG. 1 is a schematic diagram of a monitor and control system for a satellite communication according to one aspect of the present invention.

As shown in FIG. 1, the satellite communications network includes a conventional digitally equipped satellite 10, e.g., one which transmits over the usual satellite bandwidths. The satellite is preferably of the Geo-synchronous type with multiple transponders operating in the selected band. A hub terminal or station 20, which communicates with the satellite, includes a monitor and control computer or hub terminal 30, a polling modem 40 connected to hub terminal 30, a hub traffic modem 50 and a hub earth station 60, such as a dish antenna connected to modems 40 and 50. The hub station 20 may be placed at any suitable location in the network, as will be understood by those skilled in the art.

The term "hub," as used herein, is intended to designate a site for monitor and control computer 30 and polling modem 40, though the meaning of the term is intended to extend to its common and ordinary usage. "Traffic" is intended to denote the primary data to be transmitted, rather than monitor and control computer data, the scope of this term further being intended to be within the common and ordinary usage and meaning of the term.

Also provided in the network is at least one remote terminal 70, although, as shown, the system may includes a plurality of remote terminals 70, 70A and 70B. Each remote terminal 70 includes a remote computer connected to a remote traffic modem 90 and to a remote earth station 100, such as a dish antenna, although any antenna capable of transmitting and receiving signals to and from the satellite 10 is considered within the scope of the present invention. It is preferred that remote earth station 100 be physically separate from, but connected to, remote traffic modem 90. Both modems 40 and 90 transmit primary data between hub station 20 and remote terminal 70 respectively via the satellite 10. The remote terminals also transmit primary data from one remote terminal to another.

Figure 2:
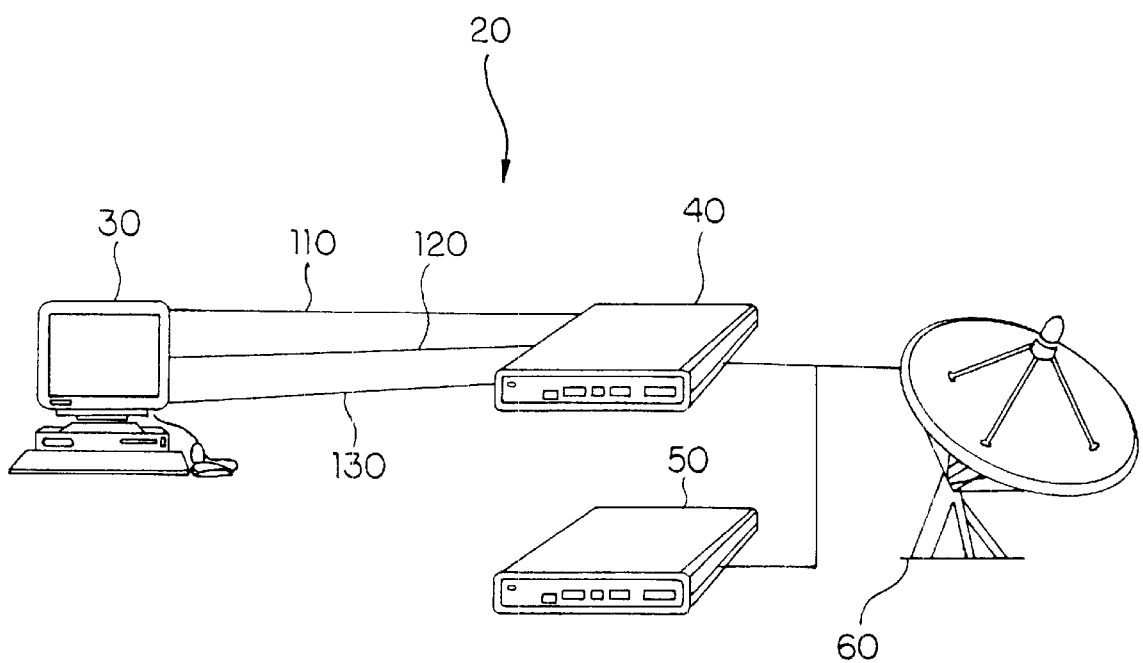
FIG. 2 is a schematic view of the hub station included in the system shown in FIG. 1.

Referring now to FIG. 2, there is shown a hub station 20 in which the monitor and control computer 30 and polling modem 40 are interconnected by a series of interfaces 110, 120 and 130. Interface 110 is a normal control interface for controlling and monitoring modem 40. Interface 120, in conjunction with a modem-to-modem overhead channel, is transmitted and received via satellite 10. Third interface 130 is used with the hub-to-modem and modem-to-hub overhead channel. Preferably, each interface, 110, 120, 130, is full duplex.

In general, to maximize flexibility and lower cost, communications between the monitor and control computer and the modems should meet the following criteria: preferably, (i) full duplex, asynchronous RS-232 or RS-422 compliance; (ii) equivalent transmit and receive data rates; and (iii) operation at standard asynchronous data rates (19,200 bps, 9600 bps, etc.). An objective is to allow the use of standard serial interfaces and communications software in monitor and control computer 30. Other known communications standards are also workable, as will be understood by those skilled in the art.

Communication between the monitor and control computer and modems preferably includes the use of a buffer, the size of which is based on the selected or anticipated maximum length of messages across the channels. Handshaking communications on the link are preferably at lower data rates. Handshaking software is desirable as handshaking hardware is not typically supported by serial interfaces.

The system operates in two phases, the initial process phase in which the terminal is not communicating with another terminal, and the regular operational phase in which a link is established between the terminal and another terminal. In the regular operational phase, system access is preferably provided by frequency and time division multiplexing of the monitor and control signals. That is, each remote terminal communicates on a different frequency, with the frequency of each terminal being selectively variable. Monitor and control information may also be time multiplexed with data at the frequencies allocated to each remote terminal.

In this manner, passage of monitor and control data from a remote terminal to the hub station, which, in turn, gathers the data by tuning to the selected frequency at the right time. Given the relatively non-fixed timing of the various remote terminals, the hub station advantageously tunes to the desired frequencies at the appropriate time, without signal overlap. Where data from different terminals is developed at the same time, but different frequencies, the hub monitor and control system is able to receive all of the data.

To send control information to the remote terminal, the hub station must address the control signals and insert the signals at the remote terminal's receiver frequency at the appropriate time. Specifically, each remote terminal transmits its data, in a time-division multiplexed format, with monitor and control information. In other words, each remote terminal transmits at a different frequency and the monitor and control packet is combined in time division with the data.

Figure 3:
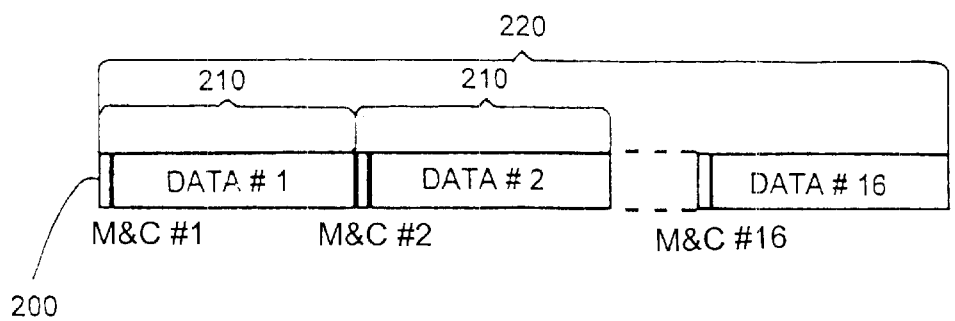
FIG. 3 is a diagram illustrating a data multiframe used in the communication system of the present invention.

Monitor and control information is preferably organized in data packets 200 of N(packet)=128 bits, as best seen in FIG. 3. Each data packet is transmitted in a frame 210 of 128×64 or 8192 bits. Sixteen frames form a multiframe 220 of 16×8192 or 131072 bits. It is preferred that time division multiplexing of data transmitted by the remote station be performed prior to error correction encoding in the transmitter. Demultiplexing in the receiver is desirably done after error correction decoding. Other suitable frame and multiframe sizes are considered within the scope of the present invention.

Figure 4:
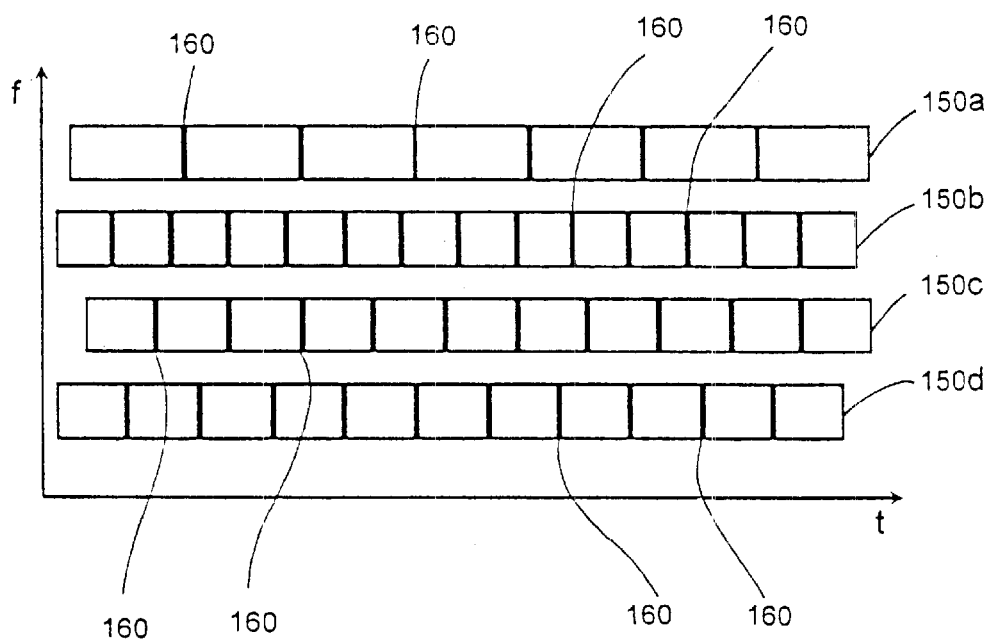
FIG. 4 is a diagram showing the frequency and time domains of various data packets used in the communication system of the present invention.

As illustrated in FIG. 4, a plurality of different data streams, here shown for purposes of illustration as for data stream, 150a, 150b, 150c, 150d, are provided, each having different data rates. Time is shown on the x-axis and frequency on the y-axis. According to one aspect of the present invention, monitor and control data packets occur at the vertical lines 160 within each data stream. In general, as shown in FIG. 4, a majority of these data packets do not occur at the same point in time. Accordingly, monitor and control computer 30 at the hub station can receive all packets with a single receiver.

Figure 5:
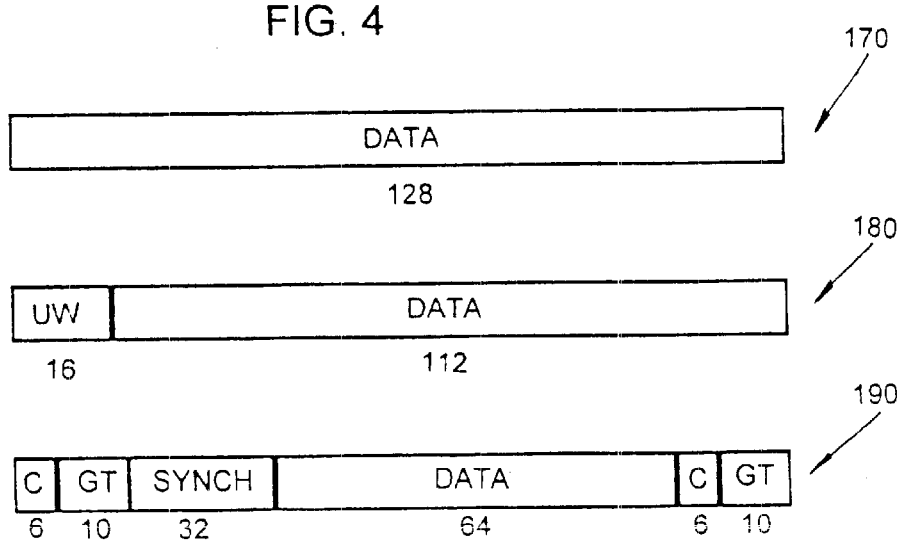
FIG. 5 is a diagram illustrating the content of various forms of data packets used in the system of the present invention.

Monitor and control data packets are preferably of three types, which are best illustrated in FIG. 5. In regular packets 170 used for monitor and control between the remote terminals, all 128 bits are reserved for monitor and control information. Packets 170 are transmitted by one remote terminal 70 to another remote terminal.

In the special packets 180, which are used by the hub station for monitoring the remote terminals, 16 out of the available 128 bits form a unique word. Packets 180 are transmitted by the remote terminal 70 to the hub terminal 20.

In the hub control packets 190, which are used to control the remote terminals, preferably 6 of the 128 bits are for the convolutional code tail of the regular data stream between remote terminals, 10 bits are allocated for guard time, 32 bits for synchronization preamble (unique word), 64 bits for data, another 6 bits of convolutional code tail and the remaining 10 bits for guard time. Packets 180 are transmitted by the hub terminal to one of the remote terminals 170.

For a selected multiframe comprising of sixteen (16) monitors and control packets, monitor and control packets are allocated proportionately, as follows: twelve (12) are preferably regular, two (2) are special, and two (2) are for hub control.

With remote terminal to remote terminal communications, if a remote terminal 70A is linked to another remote terminal 70B, then remote terminal 70A can transmit monitor and control information to remote terminal 70B using regular packets 200 in a multiframe 220 (FIG. 3). Similarly, remote terminal 70B can transmit information to remote terminal 70A using regular packets 200 in multiframe 220.

The system of the invention selectively monitors a plurality of remote terminals from a central location or hub station. According to one aspect of the present invention, the hub station is configured to "monitor-only", in which the remote terminals are only monitored for activity, while no control signals are transmitted by the hub to the remote terminals. This arrangement is used, for example, for billing to allocate satellite time and cost according to actual usage by the remote terminals. Alternatively, or concurrently therewith, the hub station both monitors the remote terminals and transmits back control signals. The hub station monitors a variety of parameters from the remote terminals including, but not limited to, transmit and receive frequencies, transmission power output, reception levels, transmit and receive data rates, Eb/No., and bit error rate. Eb/No. is a measure of the received signal to noise ratio (or bit energy, Eb, to spectral noise density, No.).

When the hub station is configured to monitor remote terminals only, the remote terminals send information to the hub station without solicitation from the hub. Since remote terminals may not be transmitting traffic continuously to the hub station, the polling modem is used to listen to the remote modem's overhead channel. In addition, the monitor and control interface for the remote modems is configured to periodically broadcast its status. Status data is, in turn, linked internally to the overhead channel.

The monitor and control system at the hub then polls the remote sites in a "round robin". More particularly, the system first tunes the hub polling demodulator to the transmission frequency and data rate of the remote sites, then waits for a carrier lock. Next, the system listens on the user-to-hub channel for special data packets containing monitoring information. Data is received and processed and, finally, tuned to the next modem.

This polling method generally requires that the system maintain a table which contains the data rate, frequency, and time-out of each remote modem. Time-outs are preferably incorporated in this table to prevent the system from becoming "stuck" at a particular site which is either not transmitting or is transmitting at the wrong frequency. Also, the table is modifiable by an operator as modems are changed, added or removed from the network.

In listening to the special monitoring packets, a selected number of the 16 monitor and control packets in a multiframe are for hub monitoring. The total time N(tune) the hub is tuned to a specified user may be calculated by the following expression:

$$N(\text{tune})=N(\text{sync})+N(\text{packet})+N(\text{conv})$$

where N(sync) is the number of bits required for synchronization, N(conv) is the number of bits required to complete the Viterbi decoding of convolutional code, and N(packet) is the number of bits in a special monitoring packet.

It is desirable that the hub station maintain a list of selected parameters for each remote terminal, such as data rate, coding rate, center frequency, and timing and frequency update, so as to keep N(sync) relatively low. Preferably, such bookkeeping functions are performed by a controller outside the modem.

According to another aspect of the present invention, the hub station preferably controls the remote terminals by transmitting control packets. In a multiframe, a selected number of the 16 monitor and control packets are for hub control. As part of the polling method described previously, the hub station sends a packet, for example, to a remote terminal 70B at the frequency used by the remote terminal 70A to transmit to remote terminal B so that the receiver at remote terminal B does not have to switch to a different frequency. The packet is sent after the hub station is synchronized to the monitor and control data transmitted from the remote terminal to the hub station. Transmission from remote terminal A to remote terminal B is then stopped temporarily to allow transmission of the control packets. A representative control packet format 190 is shown in FIG. 5. In the 128-bit length gap of data between frames, when the data stream is paused, the hub station uses the polling modem to transmit control packets.

In another feature of the present invention, collisions between data packets are monitored and controlled. Thus, in the event of a collision in time of two or more links (at different frequencies), the monitor and control modem will tune to one user and discard packets from the other users. As a result, packets be lost with a known, certain probability. Remote terminals are not synchronized with the hub station, meaning that the relative position in time of the monitor and control packets is drifting in time. This often results in collisions between packets of different remote users over time. Collision of monitoring packets, for instance, occurs due to overlapping of the total tuning times to different remote terminals. A collision of control packets, on the other hand, transpires upon overlapping of the control time slots for different remote terminals.

When the data transmission rates of two remote terminals are unequal, and one is not a multiple of the other, a collision between two remote terminals is random-like, otherwise known as "regular" or "random". If two remote terminals have data rates that are equal (or almost equal), or if one is a multiple (or almost a multiple) of the other, then the collision occurs in bursts. The number of consecutive bursts depends on the relative timing drift, commonly known as a "prolonged" collision.

Since a single receiver in the hub station cannot usually receive more than one of the colliding packets, several methods for receiving those packets that are lost can be utilized in the system of the invention.

One such method is the use of a forward error-correcting code or ECC as an outer code in addition to the codes that are used for the data transmitted by the remote terminal. A repetition code is considered the simplest to apply, i.e., by repeating the message several (K) times. In the case of collisions, the hub station determines which of the links to tune into such that, for a specific remote terminal, at least one of the K transmissions is successfully received and decoded. A second method is the application of an ARQ protocol using the control packets in order to ask for retransmission of those packets that were lost due to monitoring collisions. A third method involves the use of multiple receivers. In this method, several monitor and control modems or receivers are installed in the hub station for handling more than one incoming monitoring packet for a given time slot. The use of more than one monitor and control modem may support a larger user population. In this case, collisions may be dealt with as long as the number of users with monitor and control slots at any given time is less than or equal to the number of monitor and control modems.

Pseudo noise sequences may also be utilized for this purpose. That is, prolonged collisions may be avoided by the use of pseudo noise sequences that define the position of the monitoring and control packet within the frame. The pseudo noise monitor and control slot position within a frame will minimize the loss of packets due to the effect of prolonged collisions in a non-synchronized system. In general, the use of error-correcting codes in combination with pseudo noise sequences, as described, is a preferred method for overcoming collisions, except when the number of remote terminals is relatively large, in which case the use of multiple receivers is preferred.

By the foregoing methods, a sufficient throughput is provided for the monitor and control packets, even at relatively low overall transmission rates between remote terminals, while maintaining a majority of the transmission time for data passage. For example, the data rates for two scenarios are set forth below in TABLE I, where P(reg)=12, P(monitor)=2, and P(control)=2.

TABLE I

| Total | Data | Terminal to Terminal M & C | Hub Monitor | Hub Control |
|---|---|---|---|---|
| 260 kbps | 256 kbps | 3 kbps | .44 kbps | .25 kbps |
| 9752 bps | 9600 bps | 114 bps | 16 bps | 10 bps |

It has thus far been assumed that the users are not synchronized in time and that no restriction was imposed on the data rates. However, in some cases synchronization will be advantageous to avoid collisions among monitor and control slots. Synchronization among data users is possible by the following means: The active users have data rates which are a multiple of a common rate and have a common time frame as received in the hub section; the forward access link should contain timing information regarding common frame timing. Before a channel is allocated to a user, the user may listen to the forward access link to receive common frame timing information; the knowledge of user position can be used to calculate the time delay the common frame timing is received. The user transmission timing is adjusted such that it will reach the hub according to the common frame timing and the hub station may use the monitoring information to monitor also the timing relative to the common frame timing and will use the control slot to ask for timing corrections. Common frame timing corrections are performed by the transmitter after a prior coordination with the receiver of the receiving user.

Given the aforementioned parameters, up to about 50 active remote terminals can be monitored using a single hub station receiver. To accommodate more than 50 active remote terminals, e.g., during peak usage, either two or more receivers may be used or the monitor and control rate may be reduced.

In another aspect of the present invention, channel allocation may be used in the initialization process. Typically, for initializing links among remote terminals, one modem and two frequencies of the hub station are allocated. One frequency provides remote user terminals with random access. The terminals transmit to the hub station on this frequency, known as the "reverse access link". The other frequency, or "forward access link," is used for replying to the remote terminals and for paging inactive remote terminals. Alternatively, a control frequency allocation system may be provided.

Each link is preferably divided into frames of 32 time slots that are used as virtual channels. These channels share the forward link using time division multiplexing and the reverse link using time division multiplexed addressing. According to various aspects of the present invention, the forward access link is considered applicable to the following:

FCCH—frequency correction channel (1 channel)
SCH—synchronization channel (1 channel)
BCCH—broadcast control channel (2 channels)
PAGCH—paging and access grant channel (20 channels)
TACH/SM—traffic channel for short messages with slow associated control (8 channels).

The reverse access link is used for:
RACH—random access grant channel (24 channels)
TACH/SM—traffic channel for short messages with slow associated control (8 channels).

The preferred parameters of each link are as follows: 9600 bps, BPSK or QPSK modulation, error correcting code with convolutional rate of 1/2, 128 bit (13 1/3 msec) time slot duration, and a time frame duration of 32 time slots (426 ⅔ msec). Other selected parameters are considered workable, as will be understood by those skilled in the art.

Forward channels BCCH, PAGCH and TACH/SM are desirably time slots of 128 bits and all 128 bits are data. The reverse channels, RACH and TACH/SM, are time slots of 128 bits. Each slot of RACH is formed of the following, in sequence: 13 bits of guard time, a 32 bit synchronization preamble (unique word), 64 bits of data, 6 bits of convolutional code tail, and 13 bits of guard time.

Bandwidth on demand is desirable for automating functions necessary to manage the network, that is, once control and monitoring of the network and remote user terminals have been centralized, as above. Bandwidth on demand relates to the creation and maintenance of a data schedule for each remote terminal connection, and then, based upon the schedule, downloading new data configurations to the modems. For each circuit (i.e., connection between remote terminals or a remote terminal and a hub station), the schedule preferably contains start time and date data, end time and date, data rate, and node names or addresses.

To reconfigure the modems, the hub station preferably transmits the actual modem commands in real time using the control packets described above. Alternatively or concurrently therewith, the new configurations are downloaded and stored at a selected time before the actual circuit needs to be engaged. Upon reaching the start-up time, the remote modem reconfigures itself using the stored configuration. Accordingly, the remote modems preferably maintain a real time clock that may be synchronized with the hub station. One advantage of this method is that the hub station need not perform in real time, nor does it have to be on the air when the circuit is switched over.

Scheduling and configuration information may be input to the system in a variety of ways. One option is placement of a telephone call to the hub control center by the remote customer, requesting circuit time. An operator at the hub then manually enters the request into the schedule. Another option would be for the remote user to dial into the hub computer using the remote terminal (and a standard telephone line) and order circuit time by way of a custom application on the remote terminal, or a different user's personal computer. A further possibility is that the request be made by the remote terminal over satellite control channels. Billing would, likewise, be automated based on actual circuit usage determined by the schedule and background polling of all remote terminals.

It will be appreciated from the foregoing description that the system of the present invention provides for improved monitoring and control of a plurality of remote terminals in a mesh communication network, and in which the status and configuration of each remote terminal is monitored and controlled efficiently and non-intrusively. It will also be appreciated that various modifications to the system of the invention as described hereinabove may become apparent to those of skill in the art without necessarily departing from the scope and spirit of this invention.

What is claimed is:

1. A monitor and control system for a satellite communications network comprising a hub terminal arranged in a network with a plurality of remote user terminals to form a mesh communications network, the hub terminal including a mechanism for monitoring and controlling data communication between at least two of the remote user terminals, the monitoring and control mechanism including a mechanism for allocating dedicated time slots in the data stream transmitted by the user terminals, and a mechanism for transmitting control information to the user terminals during the dedicated time slots, the hub terminal further comprising a mechanism for receiving monitoring information from the remote user terminals during the dedicated time slots, wherein communication parameters are allocated to each pair of the user terminals, the hub terminal including a storage mechanism for storing the communication parameters of each of the user terminals, and wherein the hub terminal includes at least one monitor and control modem, the modem comprising a mechanism for tuning to the frequency of only one of the user terminals in the event of a collision in time between at least two of the user terminals.

* * * * *